United States Patent [19]
Bloom

[11] 3,901,260

[45] Aug. 26, 1975

[54] CONTROL ARRANGEMENTS FOR FLUID CONTROL VALVES

[75] Inventor: Joseph Louis Bloom, Droitwich, England

[73] Assignee: Joseph Lucas (Industries) Limited, Birmingham, England

[22] Filed: July 3, 1974

[21] Appl. No.: 485,425

[30] Foreign Application Priority Data
July 9, 1973 United Kingdom............... 32666/73

[52] U.S. Cl. ..................... 137/82; 74/519; 251/234
[51] Int. Cl.² ......................................... F16R 31/44
[58] Field of Search .................. 137/82, 83, 85, 86; 74/519, 525; 251/234

[56] References Cited
UNITED STATES PATENTS

| | | | |
|---|---|---|---|
| 2,776,669 | 1/1957 | Gorrie | 137/82 X |
| 2,851,048 | 9/1958 | Hutchinson | 137/82 X |
| 3,145,722 | 8/1964 | Mueller | 137/82 X |
| 3,680,580 | 8/1972 | Beardsley | 137/86 |

*Primary Examiner*—Alan Cohan
*Attorney, Agent, or Firm*—Holman & Stern

[57] ABSTRACT

An adze-blade control arrangement for a fluid control valve has a carriage mounted on an input control spindle of the valve. A pair of levers on the carriage are interengaged so that pivotal adjustment of one lever results in a small pivotal movement of the latter lever. An adze control element is carried by the said other lever. The adze control element can be rotated relative to the valve spindle to vary the amount by which a given angle of spindle movement causes an associated orifice to be covered by the adze element.

9 Claims, 3 Drawing Figures

CONTROL ARRANGEMENTS FOR FLUID CONTROL VALVES

This invention relates to control arrangements for fluid control valves.

It is known to provide, in fluid control valves, blade or adze-type control elements which are movable in response to angular movement of an input shaft and which have a metering edge which can traverse an associated orifice to control fluid flow therethrough. Since valves incorporating such arrangements are particularly sensitive to the position of the metering edge with respect to the orifice, it is required that the position of this edge may be adjusted relative to the angular position of the input shaft.

It may further be required that the control member shall be adjustable so that the change in the rate of flow through the orifice, for given change in angular position of the shaft, is variable.

According to the invention a control arrangement for a fluid control valve comprises a carriage, means for securing said carriage to an input shaft for pivotal movement therewith, first and second lever element pivotally mounted on said carriage, adjustment means supported on said carriage and cooperating with the first lever element to move the latter pivotally with respect to the carriage, and a blade-type metering element supported by said second lever element, said first and second lever elements co-acting and the arrangement being such that angular movement of said second lever element is substantially less than a corresponding movement of said first lever element.

A preferred embodiment of the invention also includes means for rotating the metering element blade with respect to the axis of pivotal movement of said carriage.

An embodiment of the invention will now be described by way of example and with reference to the accompanying drawings in which.

Figure 1:
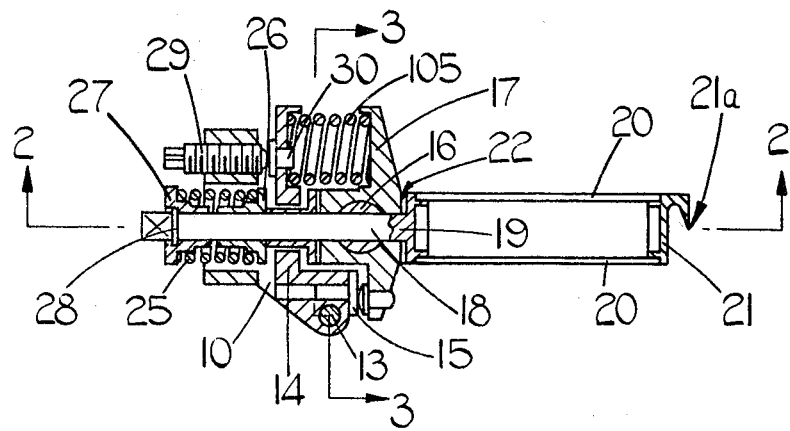
FIG. 1 is a section through a valve control arrangement.
Figure 2:
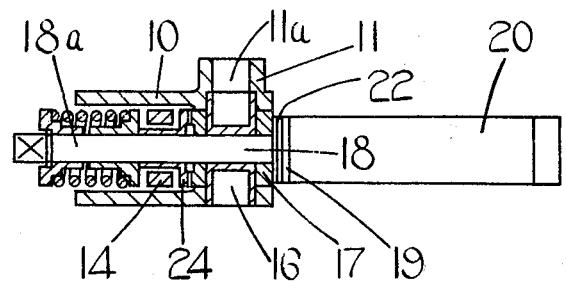
FIGS. 2 and 3 are sections on the corresponding lines in FIG. 1.
Figure 3:
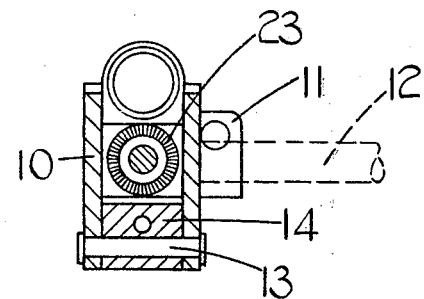

A carriage 10 has an integral boss 11 having a bore 11a which enables the carriage 10 to be clamped to a input spindle 12. Mounted on carriage 10 for pivotal movement about a pin 13 is a first lever 14. Lever 14 has an abutment 15 adjacent pin 13, and thus provides a third order lever.

A pin 16 is pivotally mounted in the carriage co-axially with the bore in the boss 11. A second lever 17 is carried on pin 16 and a flange stem 18 passes through the pin 16 and lever 17, so that the pin 16, lever 17 and stem 18 move in unison about the axis of pin 16. Lever 17 is a first order lever, one end of which engages the abutment 15 of lever 14. A compression spring is engaged between the other end of lever 17 and the end of lever 14 remote from the pin 13.

Secured to the flange 19 of stem 18 are a pair of spaced parallel resilient strips 20, to the other ends of which is secured a control member in the form of an adze blade 21. The leading edge 21a of blade 21 lies, as shown, in a plane which is parallel to the axis of the bore 11a and hence to the axis of the spindle 12. Shim washers 22 are located between flange 19 and an adjacent surface of lever 17 to enable the adze bladde 21 to be brought into contact with a surface which has an associated metering orifice. A face of lever 17 remote from the shim washers 22 is formed with a plurality of radially extending serrations 23. The portion 18a of the stem 18 which extends clear of the lever 17 has a square cross section and passes through a square bore in a flanged bush 24. The flange of bush 24 is also formed with radially extending serrations which are complementary to, and engaged with, the serrations 23. There are 48 equi-spaced serrations on the lever 17 and on the bush 24. The leading edge of the adze blade 21 may thus be located, in steps of 7½°, relative to the axis of the shaft 12. A compression spring 25 is engaged between bushes 26, 27 which are slidable on stem portion 18a. Bush 27 engages a circlip 28 on stem 18. Spring 25 thus biases the serrated portions into engagement and also urges the flange 19 towards lever 17.

A screw 29 is mounted in the carriage 10 and engages an abutment 30 on lever 14 at the end thereof remote from pivot pin 13. The lever ratio of lever 14 is 10:1. Screw 19 may therefore have a relatively coarse thread and still permit fine adjustment of the axis of stem 18 relative to the carriage 10.

I claim:

1. A control arrangement for a fluid control valve, comprising a carriage, means for securing said carriage to an input shaft for pivotal movement therewith, first and second lever elements pivotally mounted on said carriage, adjustment means supported on said carriage and co-operating with the first lever element to move the latter pivotally with respect to the carriage, and a blade-type metering element supported by said second lever element, said first and second lever elements being operatively interconnected so that angular adjustment of the first lever element imparts an angular movement to the second lever element, and the arrangement being such that angular movement of the second lever element is substantially less than a corresponding movement of the first lever element.

2. An arrangement as claimed in claim 1 in which said first lever element is a third order lever, and said second lever element engages said first lever element intermediate the pivot and the free end thereof.

3. An arrangement as claimed in claim 2 in which said adjustment means comprises a screw engaging said free end of the first lever element.

4. An arrangement as claimed in claim 2 in which said second lever element is a first order lever, and which includes biasing means urging one end of said second lever element into engagement with said first lever element.

5. An arrangement as claimed in claim 4 in which said biasing means is engaged between the other end of said first lever element and the free end of said second lever element.

6. An arrangement as claimed in claim 1 in which said metering element includes a pair of spaced, parallel resilient members, each said member being supported at one end on said second lever element, and a blade secured to the other ends of said resilient members.

7. An arrangement as claimed in claim 1 in which the metering element blade has a leading edge which lies in a plane substantially parallel to an axis of said means for securing said carriage to said shaft.

8. An arrangement as claimed in claim 7 which includes means for rotating said leading edge in said plane thereof.

9. An arrangement as claimed in claim 8 in which said rotating means comprises a flanged stem forming part of said metering element and extending through said second lever element, a plurality of interengaged serrations on said flange and said second lever element, and means biasing said serrations into said engagement.

* * * * *